(12) United States Patent
Casper et al.

(10) Patent No.: US 8,350,070 B2
(45) Date of Patent: *Jan. 8, 2013

(54) METHODS OF PREPARING HYDROXY FUNCTIONAL VEGETABLE OILS

(75) Inventors: David M. Casper, Normal, IL (US); Trevor Newbold, Freeport (BS)

(73) Assignee: Biobased Technologies LLC, Springdale, AK (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,609

(22) Filed: Mar. 15, 2012

(65) Prior Publication Data

US 2012/0172610 A1    Jul. 5, 2012

Related U.S. Application Data

(63) Continuation of application No. 12/964,908, filed on Dec. 10, 2010, which is a continuation-in-part of application No. 11/193,813, filed on Jul. 28, 2005, now Pat. No. 7,893,287, which is a continuation-in-part of application No. 10/924,332, filed on Aug. 23, 2004, now abandoned.

(51) Int. Cl.
*C07C 51/16* (2006.01)
(52) U.S. Cl. ........................ 554/138; 554/213
(58) Field of Classification Search .................. 554/138, 554/213
See application file for complete search history.

(56) References Cited

U.S. PATENT DOCUMENTS

| | | | |
|---|---|---|---|
| 1,926,769 A | 9/1933 | Hailwood et al. | |
| 2,073,011 A | 3/1937 | Hubbuch | |
| 2,485,160 A | 10/1949 | Niederhauser et al. | |
| 2,752,376 A * | 6/1956 | Julian et al. | 554/138 |
| 3,169,139 A | 2/1965 | D'Addieco | |
| 4,749,517 A | 6/1988 | Chwang et al. | |
| 7,279,448 B2 | 10/2007 | Erhan et al. | |

FOREIGN PATENT DOCUMENTS

| DE | 4332292 | 3/1995 |
|---|---|---|
| WO | WO-2006-014521 | 2/2006 |

OTHER PUBLICATIONS

Friguelli et al. "One-Pot-Two Steps Synthesis of 1,2-Diol." *Synthetic Communications*, 1989, 19(11 & 12):1939-1943.
Luong et al. "Direct Hydroxylation of Fats and Derivatives with a Hydrogen Peroxide Tungstic Acid System." *Journal of American Oil Chemists' Society*, 1967, 44:316-320.
Putilov et al. Chem. Abstr., 2003, 140-202144.

* cited by examiner

*Primary Examiner* — Deborah D Carr
(74) *Attorney, Agent, or Firm* — Wilson, Sonsini, Goodrich & Rosati (57) ABSTRACT

Simple, economical preparative processes for the provision of pure hydroxyl functional materials that are derived by converting the alkene groups of the unsaturated molecules found in vegetable oils, into hydroxyl groups.

18 Claims, 5 Drawing Sheets

METHODS OF PREPARING HYDROXY FUNCTIONAL VEGETABLE OILS

CROSS-REFERENCE

This application is a continuation of U.S. patent application Ser. No. 12/964,908, filed on Dec. 10, 2010, which is a continuation-in-part of U.S. patent application Ser. No. 11/193,813, filed on Jul. 28, 2005, which issued as U.S. Pat. No. 7,893,287 on Feb. 22, 2011, which is a continuation-in-part of U.S. patent application Ser. No. 10/924,332, filed Aug. 23, 2004, now abandoned, which applications are incorporated herein by reference.

BACKGROUND OF THE INVENTION

The invention disclosed and claimed herein deals with a novel process of preparing hydroxy functional vegetable oils and the vegetable oils so prepared.

Vegetable oils have been familiar to man since prehistoric times and for centuries, humans have used fats and oils for food and a variety of other uses. Humankind has over the years perfected the science surrounding the ability to produce oils from agriculture products for their own use. Today, millions of pounds of such oils are used in a variety of end use applications.

Vegetable oils are made up principally of triglycerides containing both saturated and unsaturated moieties, wherein the predominant moiety is the unsaturated variety. Even though the triglycerides lend themselves to many end use applications, there are some needs for these materials to have functionalities different than those that are found in the raw vegetable oil.

For example, the triglycerides can be converted to hydroxy functional compounds and the hydroxyl functional compounds can then be made useful, for example, in the formation of urethanes by reacting the hydroxyl groups with isocyanates. Coatings, adhesives, elastomers, foams and composites can be made from elastomers using such hydroxyl functional compounds. Unfortunately, some commercially available soy-based hydroxy functional compounds suffer from having an unpleasant odor that is often compared to stale French fries or old, used cooking oil. This odor transfers into articles made from such compounds, especially foam articles. This unpleasant characteristic of known soy-based polyols is one factor that has hindered their commercial success in polyurethane manufacturing.

Another issue that has hindered commercial success of soy-based polyols is that prior known soy polyols are not freeze/thaw stable. Even simple cooling of the oil down to about 10° C. will start the process of visible solids precipitating out of the oil. Actually freezing the oil only accelerates this process. After warming back up to ambient temperatures, the small, particulate solids driven out of the oil remain visible to the naked eye. With heat and stirring, the solids can be made to go into solution again. However, unless specifically removed, or re-dissolved, these solids could be expected to present downstream handling problems such as filter, valve and orifice plugging. If vegetable oil based polyols can be produced that sustain freeze/thaw stability, then subsequent handling problems could be essentially eliminated.

Currently, triglycerides are hydrolyzed with water that is catalyzed by enzymes, acids, or metals to yield glycerol products, that is, where the ester groups are removed and replaced with carboxyl moities. Such molecules still have unsaturation in them even after such treatment.

Fringuelli, and co-workers, have reported on a process to convert alkenes into 1,2-hydroxy groups using peroxy acids in deionized water. The process involves the epoxidation of the alkene, and then the epoxide ring is directly opened by organic acid and water, or via base hydrolysis to produce the hydroxy. It is stated by Fringuelli, et al that the synthesis does not require organic solvents. (Friguelli, F., Germani, R., Pizzo, F. and Savelli, G., ONE-POT TWO-STEP SYNTHESIS OF 1,2 DIOL, Synthetic Communications, 19(11 & 12), 1939-1943 (1989).

What has been discovered herein is a simple, economical preparative process for the provision of hydroxyl functional polyols that are derived by converting the alkene groups of the unsaturated molecules that make up vegetable oils, into hydroxyl groups. Furthermore, the polyols according to the invention overcome deficiencies of known products and processes by providing a non-malodorous, freeze/thaw stable product, among other benefits.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

THE INVENTION

One aspect of the invention described and claimed herein deals with a process of preparing hydroxy functional vegetable oils. Thus, the invention comprises contacting a raw vegetable oil with hydrogen peroxide and an organic acid in the presence of water for a sufficient period of time and at a sufficient pressure, and at a sufficient temperature to form a hydroxy ester from unsaturated moieties in the vegetable oil, and thereafter separating any volatiles from the hydroxy functional vegetable oil, wherein the organic acid has from 1 to 3 carbon atoms.

A second embodiment of this invention is a process of preparing a pure hydroxy functional vegetable oil, the process comprising contacting a raw vegetable oil with acetic acid to form an organic phase; combining hydrogen peroxide and acetic acid in water to form an aqueous phase and adding the aqueous phase to the organic phase keeping the amount of hydrogen peroxide in the safe region of the hydrogen peroxide triangle; cooling the resulting materials to 50 to 90° C. and allowing the organic phase and the aqueous phase to separate and separating the aqueous phase from the organic phase; moving the organic phase to a degasser (flash evaporator) that is heated to at least 50 to 90° C. and 5 to 15 mm Hg prior to the movement of the organic phase into the degasser; flashing off the majority of the residual acetic acid and aqueous phase;

feeding the product to a first wiping film evaporator and subjecting the product to a first pass through the wiping film evaporator at about 5 to 20 nun Hg, 60 to 140° C., wipe speed of about 300 to 350 rpm and a feed flow rate of about 25 to 45 pounds per hour while maintaining the internal condenser temperature at about 0 to 12° C.; feeding the product to a second wiping film evaporator for a pass at about 0.001 to 0.003 mmHg, 220 to 260° C., wipe speed at about 300 to 350 rpm and a feed flow rate of about 25 to 35 pounds per hour while maintaining the internal condenser temperature at about 35 to 70° C.; cooling the product and recovering the product.

A third embodiment of this invention is a process of preparing a hydroxy functional vegetable oil, the process comprising providing a pressure reactor that is capable of being sealed; adding raw vegetable oil to acetic acid in the pressure reactor to form an organic phase and an aqueous phase; sealing the reactor and heating to about 85 to 120° C. with agitation; metering a 35 to 70% weight/weight of hydrogen peroxide/water to the hot mixture; heating the reaction mixture to about 120 to 135° C. under a pressure of about 12-45 psig for about 1.5 to 3 hours and then cooling the mixture to about 50 to 90° C. without agitation; removing the aqueous phase from the pressure reactor; stripping off the bulk of the acetic acid, aqueous phase and other low boilers at 90 to 150° C. and 5 to 60 mm Hg; applying a negative pressure of about 2 to 15 mm Hg under a nitrogen sparge and heating the materials to about 220 to 260° C. until the reaction mixture tests for an acid number of 0.5 mg KOH/g or less.

Yet another embodiment of this invention is a process of preparing a pure hydroxy functional vegetable oil, the process comprising contacting a raw vegetable oil with acetic acid to form an organic phase; combining hydrogen peroxide and acetic acid in water to form an aqueous phase and adding the aqueous phase to the organic phase keeping the amount of hydrogen peroxide in the safe region; cooling the resulting materials to less than 50 to 90° C. and allowing the organic phase and the aqueous phase to separate and separating the aqueous phase from the organic phase; moving the aqueous phase to a holding tank and then recycling the aqueous phase; moving the organic phase to a degasser that is heated to at least 50 to 90° C. and 5 to 15 mm Hg prior to the movement of the organic phase into the degasser; flashing off the majority of the residual acetic acid and aqueous phase and feeding the residual acetic acid and aqueous phase to a fractional distillation column for recovery and recycling; feeding the product to a first wiping film evaporator and subjecting the product to a first pass through the wiping film evaporator at about 5 to 15 mmHg, 60 to 140° C., wipe speed of about 300 to 350 rpm and a feed flow rate of about 25 to 45 pounds per hour while maintaining the internal condenser temperature at about 0 to 12° C.; collecting the evaporate in an acid holding tank; feeding the product to a second wiping film evaporator for a pass at about 0.001 to 0.003 mmHg, 220 to 250° C., wipe speed at about 300 to 350 rpm and a feed flow rate of about 25 to 45 pounds per hour while maintaining the internal condenser temperature at about 35 to 70° C.; collecting the evaporate in an acid holding tank; cooling the product and recovering the product.

Still another embodiment is a process of preparing a pure hydroxy functional vegetable oil, the process comprising providing a pressure reactor that is capable of being sealed; adding raw vegetable oil to acetic acid in the pressure reactor to form an organic phase and an aqueous phase; sealing the reactor and heating to about 85 to 120° C. with agitation; metering a 35 to 70% weight/weight of hydrogen peroxide/water to the hot mixture; heating the reaction mixture to about 120 to 135° C. under a pressure of about 12 to 45 psig for about 1.5 to 3.0 hours and then quenching the mixture to about 50 to 90° C. without agitation; separating the aqueous phase from the pressure reactor and moving to a distillation column for the recovery of the acetic acid; stripping off bulk of the acetic acid, aqueous phase and other low boilers from the product at 90 to 150° C. and 5 to 60 mm Hg and moving the acetic acid, aqueous phase and other low boilers to a distillation column and recovering the acetic acid; applying a negative pressure of about 2 to 15 mm Hg under a nitrogen sparge and heating the materials to about 220 to 260° C. until the reaction mixture tests for an acid number of 0.5 mg KOH/g or less and collecting any acids removed from the product.

Going to yet another embodiment of the invention is a process of preparing a pure hydroxy functional vegetable oil, the process comprising contacting a raw vegetable oil with hydrogen peroxide and an organic acid in the presence of water for a sufficient period of time, a sufficient temperature, and a sufficient pressure to form hydroxyl groups from unsaturated moieties in the vegetable oil; separating any volatiles from the hydroxylated functional vegetable oil at a temperature of less than about 90 to 150° C.; charging the product to a distillation vessel equipped with a condenser and distillate receiver; start agitation of the product and provide a negative pressure of about 5 to 60 mm Hg to the vessel; heat the vessel to about 90 to 140° C. and hold at that temperature until the distillate ceases; provide a nitrogen sparge of about 2 to 8 standard cubic foot/hour/100 pounds of product and strip the volatiles; heat the product to 220 to 250° C. while removing distillate until the acid number of the product is 0.5 mg KOH/g or less, wherein the organic acid found in the initial reaction has from 1 to 3 carbon atoms.

Still another embodiment of this invention is a process of preparing a pure hydroxy functional vegetable oil, the process comprising contacting a vegetable oil with hydrogen peroxide and an organic acid in the presence of water for a sufficient period of time, a sufficient temperature and a sufficient pressure to form hydroxyl groups from unsaturated moieties in the vegetable oils.

Thereafter, phase separating the reaction mass into an organic phase containing the hydroxylated vegetable oil, and a aqueous phase and removing volatiles from the organic phase at a temperature of less than 90 to 150° C. and a pressure of 5 to 60 mm Hg or less.

Thereafter, heating the product to a temperature in the range of about 220° C. to 250° C. and moving the heated product downwardly through a packed column while forcing, under pressure, a material selected from the group consisting of steam and a gas non-reactive with the vegetable oil, up through the packed column to remove high boiling impurities and organic acids and thereafter collecting the hydroxylated vegetable oil.

Antioxidants can now be added to the vegetable oil to extend the life of the final product if desired. This step of addition of antioxidants is applicable to all of the production methods discussed herein. The final product is normally aged with and stored under nitrogen.

What is meant by "raw" vegetable oil is vegetable oil that has been obtained by normal processing techniques, without any modification to the chemistry of the oil itself. This vegetable oil can be crude, refined, bleached, deodorized, winterized, or modified, hybrids, and can be used as obtained from the producers.

The vegetable oil is contacted with hydrogen peroxide and an organic acid in the presence of water. For purposes of this invention, the vegetable oil can be selected from any available vegetable oil, among which are the more common vegetable oils, such as corn oil, palm oil, soybean oil, cottonseed oil, peanut oil, rapeseed oil, safflower oil, canola, rice bran oil, and sunflower oil. Preferred for this invention are corn oil, cottonseed oil, soybean oil, canola oil and palm oil, and most preferred are soybean oil and palm oil.

Figure 2:
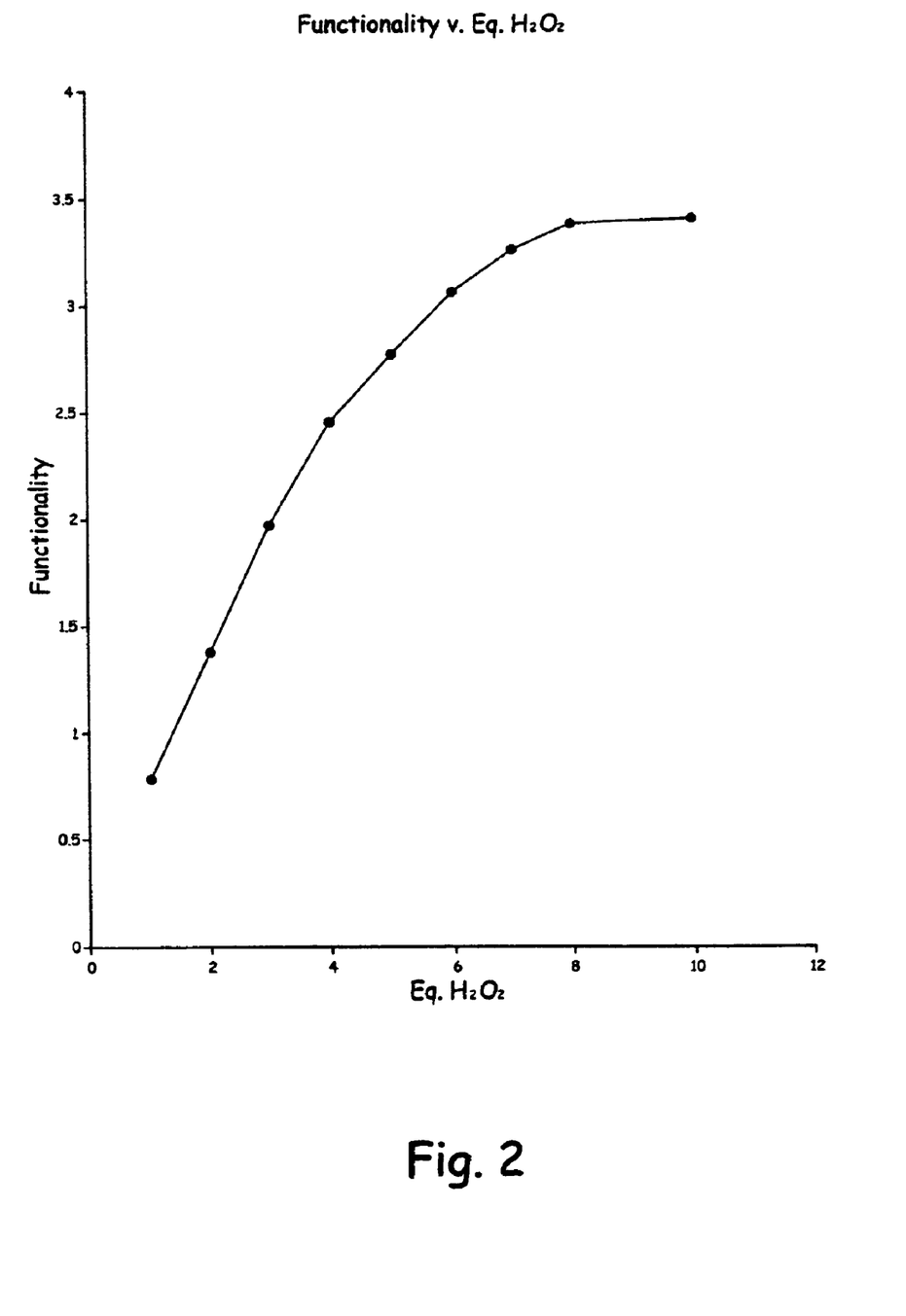
FIG. 2 is a graph of hydroxyl functionality versus the equivalents of peroxide used in the reaction to show the effect of excess peroxide.

In the process, the vegetable oil is contacted with hydrogen peroxide and an organic acid in the presence of water. The amount of hydrogen peroxide that is used ranges from about 0.1 to about 6.0 equivalents per mole of triglyceride. The hydroxyl functionality desired determines the amount of hydrogen peroxide used within that range. As noted, about 6.0 equivalents will give a hydroxyl number of about 180 to 190. The effect of using larger amounts of the peroxide is illustrated in FIG. 2.

The amount of organic acid that is used is based on the amount of raw vegetable oil that is used, in that, there is used on the order of less than about 2.0:1 and preferably between about 4:1 to about 2.0:1 mass of acid to vegetable oil used. The organic acid is used in the ring opening reaction and may also act as a solvent. For this invention, examples of organic acids that are useable are those having from 1 to 3 carbon atoms and mixtures thereof. Such acids are, for example, formic, acetic and propionic.

The water in the reaction comes primarily from the peroxide that is used. At lower concentrations of hydrogen peroxide, more water is added to the system. As the molar equivalents of peroxide are increased, so does the amount of unsaturation converted to epoxide. The molar amount of peroxide used determines the molar amount of peracid formed. This, in turn, determines the amount of unsaturation converted to epoxide, then to hydroxyl compound.

The viscosity of the final hydroxylated vegetable oil ranges from 300 to 32,000 mPa·s and can be controlled either by the controlled oxidation of crude soybean oil (CSO), or by the length of the carbon chain on the acid that becomes the ester portion of the molecule in the product. Thus, wherein as R in RCOOH becomes larger, the viscosity decreases at no cost to functionality of the resultant polyol.

Figure 1:
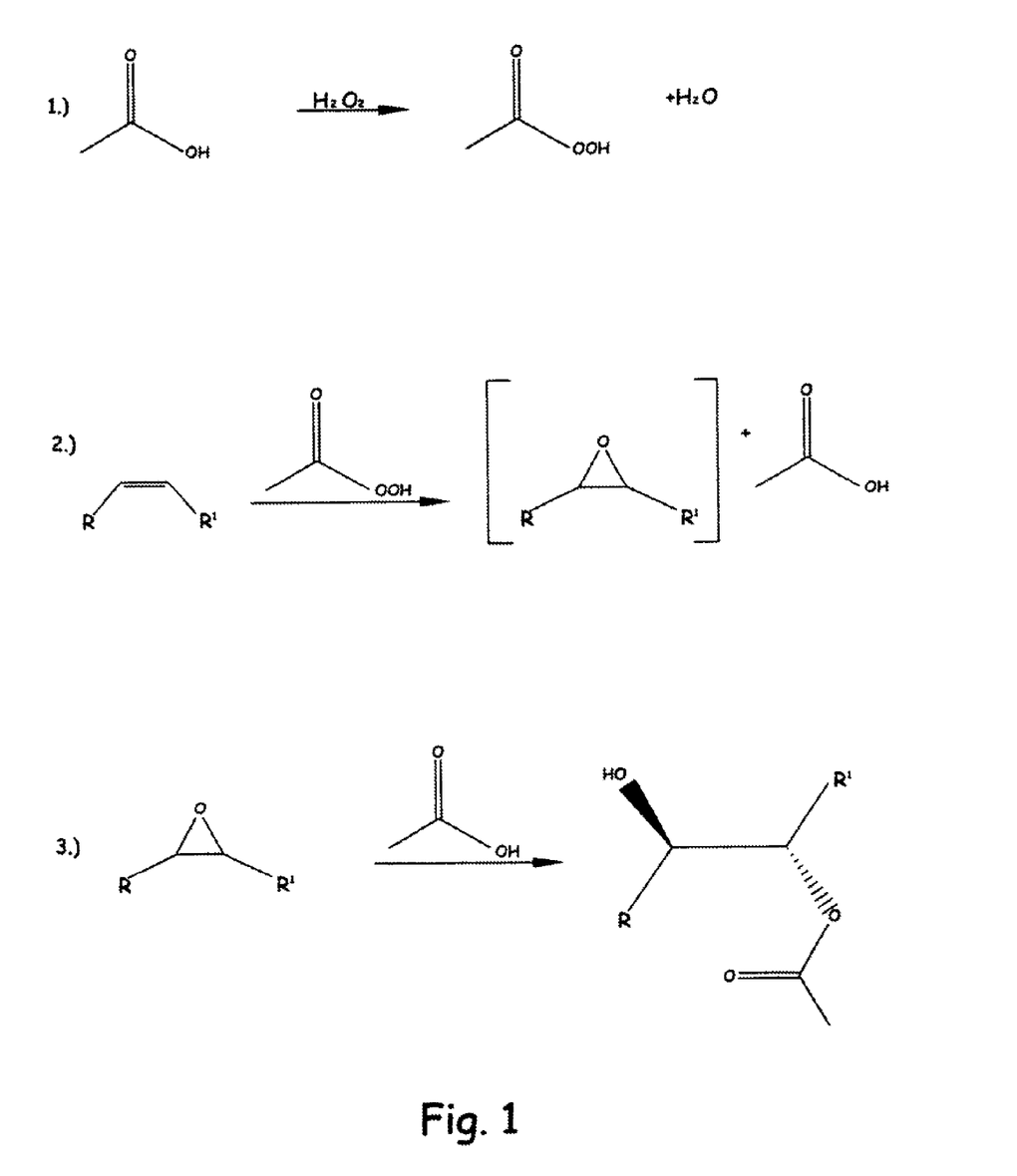
FIG. 1 is a schematic of the proposed reaction scheme to prepare the products of this invention and consists of parts 1, 2, and 3.

The inventors herein do not want to be held to such a theory, but the schematic reaction sequence illustrated in FIG. 1 demonstrates this point, wherein the designations R and $R^1$ are the various segments forming the remainder of the vegetable oil. An organic acid, for example, acetic acid forms a peracid in the presence of peroxide, such as hydrogen peroxide, with formation of by-produced water, i.e. reaction scheme 1 (FIG. 1). Thereafter, the peracid reacts with the unsaturation in the vegetable oil to form the epoxide ring and a by-produced organic acid, as is shown in reaction scheme 2 (FIG. 1). Thereafter, the epoxide ring is opened by the influence of an organic acid to form the hydroxy ester as is shown in reaction scheme 3 (FIG. 1).

A variety of solvents may be used in this process. Any aprotic solvent may be used other than ethers, as they have been shown to form explosive peroxides.

The reaction time for this process ranges from about 1 hr. to about 24 hours.

The temperatures that are useful for the reactions can range from room temperature to the reflux temperature of the mixture.

It is preferred to add the peroxide to the vegetable oil after the organic acid, but the order of addition can be changed.

The hydroxylated vegetable oils produced by this invention are pure polyols, in that, they have the following characteristics: they are freeze/thaw stable, low odor, color of less than 0.5, acid numbers of less than 1.0 mg KOH/g, no residual peroxygens, less than 0.01% w/w of water, less than 0.01% w/w of organic acids used as the starting materials, using the AOCS Official Process CD-22-91 wherein the results are reported as % (A/A) and using the following standard processes of analysis: AOCS Official Process, Cd 3d-63 for acid value; AOCS Official Process, Cd 1-25 for Iodine value of fats and oils, Wijs Process; AOCS Official Process, Cd 13-60 for hydroxyl values, and AOCS Official Process, Cc 13c-50 color spectrophotometer process.

"Low odor" for purposes of this invention means that the polyols have a rating of 7 or greater on the SAE J1351 test wherein the rating scale of the SAE J1351 test is replaced by the GME 60276 rating scale.

Some commercially offered soy-based polyols have suffered from having an odor that is best described simply as being characteristic of soybean oil. This odor is easily detected by the human nose and has been compared to that of stale French fries or old, used cooking oil. The odor can be found in neat liquid soy polyol and transfers into any foam article made using such polyols. The odor inherent in previously known soy-based polyols has been one factor in such polyols not having widespread and long-running commercial success.

The protocol for the odor testing was based on the Society of Automotive Engineers (SAE) test method SAE J1351-93. The test involves putting a small amount of sample into a metal one quart paint can, heating it up and letting people smell it and rate the odor on a numerical scale. An empty metal can and a can containing normal petroleum-based polyether polyol with a composition similar to the soy-based polyols were used as controls.

Raw soybean oil itself is not freeze/thaw stable. Even simple cooling of the oil down to about 10° C. will start the process of visible solids precipitating out of the oil. Actually freezing the oil only accelerates this process. After warming back up to ambient temperatures, the small, particulate solids driven out of the oil remain visible to the naked eye. With heat and stirring, the solids can be made to go into solution again. Unless specifically removed, or re-dissolved, these solids could be expected to present downstream handling problems such as filter, valve and orifice plugging. If oils can be produced that sustain freeze/thaw stability, then the handling problems set forth Supra could be essentially eliminated. For purposes of this invention, "freeze/thaw stability" means at least 5 cycles of freeze/thaw.

Several processes can be used for purifying the vegetable oils after the hydroxylated version is formed. Such processes are disclosed in detail in the examples that follow, but generally, they consist of the use of bulk evaporation to remove a majority of the low boiling volatiles, distillation, wiping film evaporation, falling film, packed column, and the like, using negative pressures and elevated temperatures, with the negative pressures and elevated temperatures being closely controlled such that the oils do not end up with impurities and/or odors or color.

One process is the vacuum-sparge-distillation process and consists of initially removing the principal solvent and other low boiling compounds by standard processes such as for example, atmospheric or vacuum distillation. It is important that the temperature during this step of the process is kept at less than 150° C. and preferably 120° C. to 140° C. If the temperature is allowed to rise above 150° C., the product will start to discolor. The longer that the temperature is at this level, the darker the product becomes and this is to be avoided in this invention.

At this point, the product is a hydroxyl-functional vegetable oil. In this and the other processes of this invention, peracetic acid is generated and it is this oxidant that diffuses across the interfacial boundary of the organic phase and the aqueous phase, where it reacts with one of the hindered double bonds on the triglycerides, to form the polyol. This process repeats itself until the alkenes have been converted to hydroxyl groups, resulting in the functional polyols of this invention.

The reaction vessels used in these inventive processes have to be glass-lined, or manufactured from metal alloys that do not impart color to the product.

The semi-pure polyol is charged into a distillation vessel for the remainder of this aspect of the invention and it is preferred that the vessel be maintained at about 85 to 90% by volume full.

The semi-pure polyol is generally agitated and coolant is applied to the condenser of the distillation vessel and at this point, a vacuum is applied. The vessel is heated to about 90 to 150° C. and held at that temperature until the distillate ceases.

A nitrogen sparge of about 2 to 8 standard cubic foot/hour per 100 pounds of product is applied and the product is continued to be agitated. Finally, the product is heated up to about 220 to 230° C. and the distillate is removed. When the distillate ceases, the reaction is finished.

The second embodiment of this invention is called atmospheric reflux reaction with wiping film evaporator. In this process, the reaction takes place in a two phase system. The vegetable oil is dissolved in acetic acid forming the organic phase. The oxidant, that is, peracetic acid, is generated in situ by the addition of 35 to 70% w/w hydrogen peroxide. This gives rise to the aqueous phase. At room temperature the reaction between these components is not evident. Heating to about 85 to 110° C. generates peracetic acid in situ, and aging at that temperature under reflux takes the reaction to completion.

The oxidant is split in proportionately between the aqueous and organic phases, with the higher concentration found in the aqueous phase. The oxidant diffuses across the interfacial boundary separating the phases, where it finds and reacts with hindered double bonds in the vegetable oil to form the polyol. This process repeats itself until the alkenes have been converted to hydroxyl groups, resulting in the hydroxy functional polyol.

The order of raw material addition in this reaction is important. The two primary reasons are viscosity and peroxidant concentration. The correct order of addition reduces the load on the agitator and keeps the hydrogen peroxide concentration within the safe region of the hydrogen peroxide triangle.

Hydrogen peroxide solutions of high strength (80% or greater) can be made to explode, but they are very insensitive and can only be initiated with difficulty. Mixtures of hydrogen peroxide and organics can also be explosive, and can be made with hydrogen peroxide of moderate strengths (lower limit is 45%). In contrast, high strength hydrogen peroxide/organic mixtures may be extremely sensitive.

Figure 3:
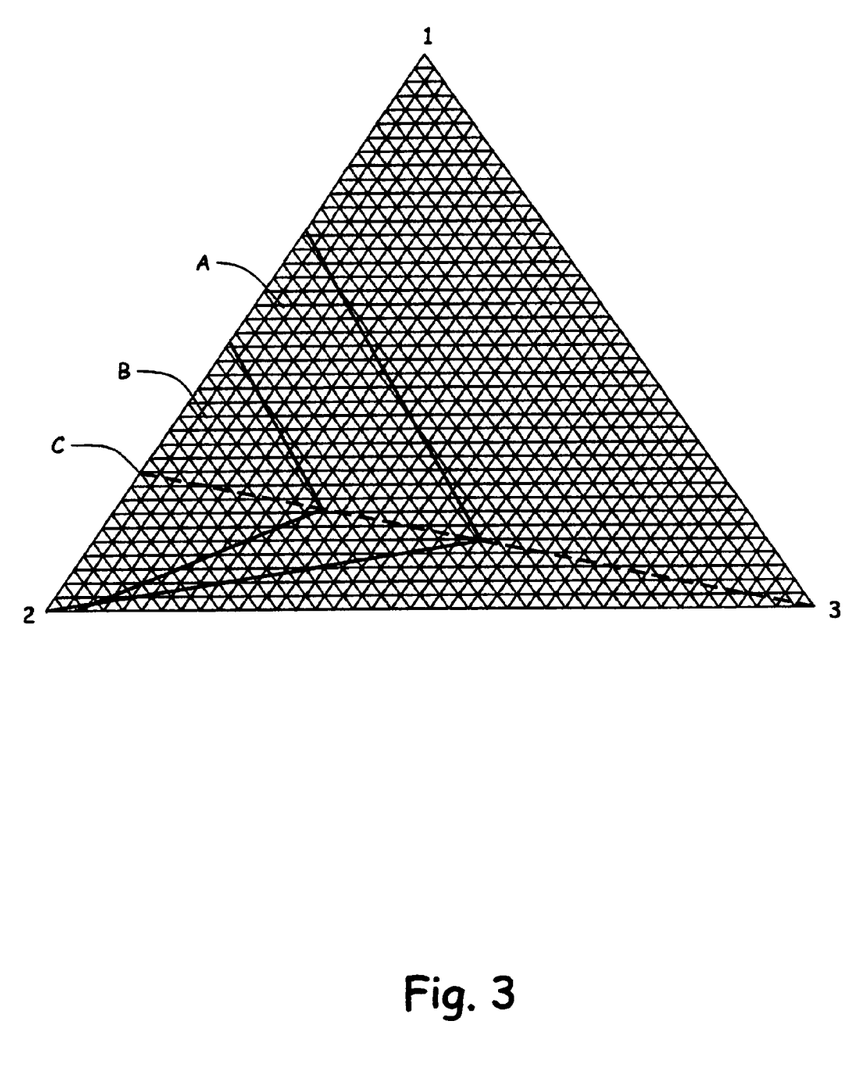
FIG. 3 is a triangular graph showing different explodable regions for peroxide systems.

The triangular graph shown in FIG. 3 shows different regions for hydrogen peroxide/organic mixtures, wherein A is the explosive region, B is the detonation region, and C is the stoichiometric line. Also shown are the designations 1 for the organic apex, 2 for the hydrogen apex, and 3 for the water apex. The stoichiometric line joins the hydrogen peroxide/organic baseline with 100% water through the apex of the explosive area. Explosive power of the mixtures decreases as the composition moves away from the stoichiometric line.

Figure 4:
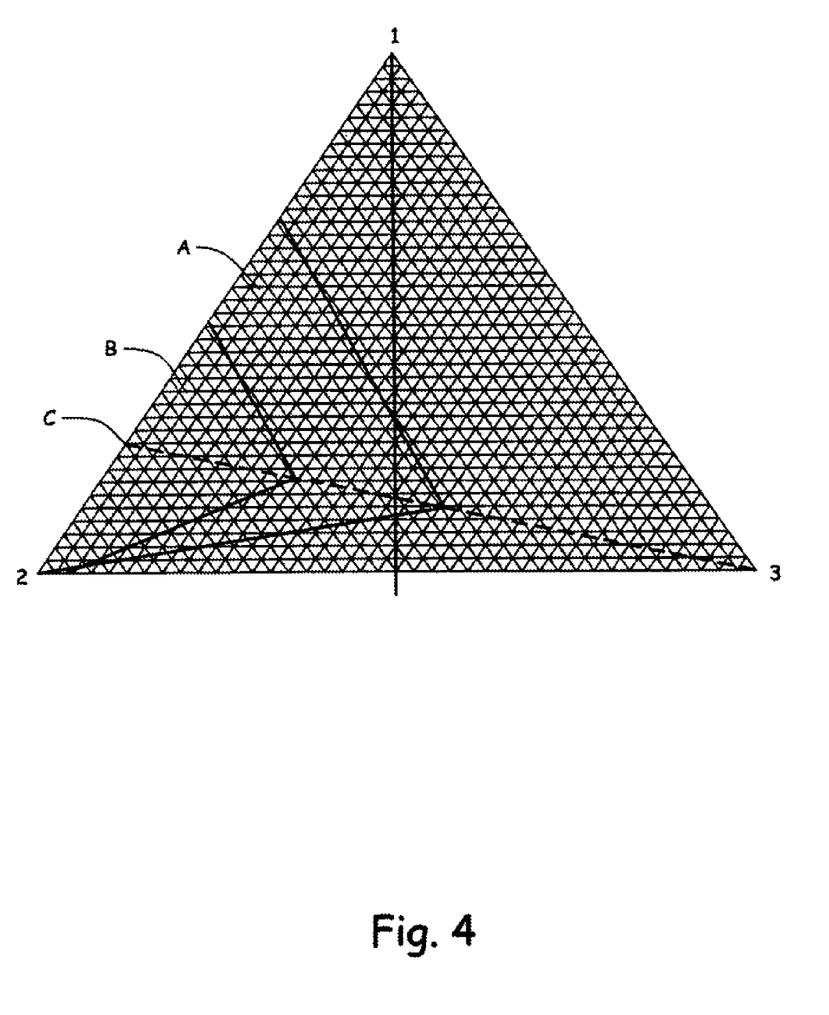
FIG. 4 is a triangular graph of 50% hydrogen peroxide and organic solvent with 100% concentration.
Figure 5:
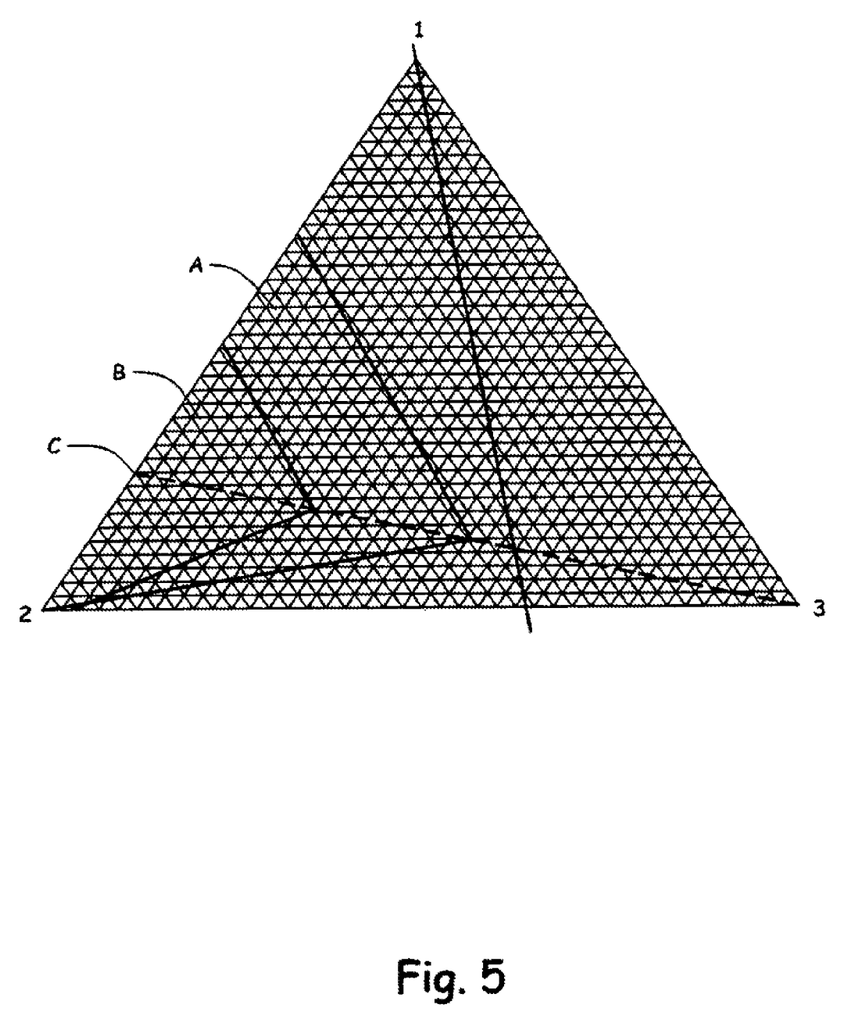
FIG. 5 is a triangular graph of 30% hydrogen peroxide and organic solvent with 100% concentration.

The mixture compositions can be determined by drawing a line between the concentration of the organic solvent and the initial concentration of the hydrogen peroxide. The FIG. 4 shows the mixture concentration of 50% hydrogen peroxide initial concentration and an organic solvent of 100% concentration wherein A, B, C, 1, 2, and 3 are as designated just above. As shown this line passes through the explosive region and is potentially hazardous. To avoid potential explosive mixtures, the hydrogen peroxide is diluted from 50% concentration to 30% concentration by adding water first before it is mixed with organic solvents as shown in the FIG. 5 wherein A, B, C, 1, 2, and 3 are as designated just above.

The non-explosive regions as shown in the Figures are outside of the explosive regions and are the "safe" regions of this invention.

The resulting mixture is then cooled to approximately 50 to 90° C. for phase separation and the agitator shut off in order to avoid the formation of an emulsion. The lower aqueous phase is diverted to a holding tank for analysis. Approximately 80 to 85% w/w of this stream is recycled to the next reaction batch. The organic phase is transferred to the wiping film evaporator feed tank for purification.

The first step in the purification is to flash off the bulk of the acetic acid and aqueous phase remaining in the product. This step leaves a small amount of acetic acid and water in the polyol. The condensate collected from this step is fed to the fractional distillation column feed tank for recovery.

The polyol is then fed to a wiping film evaporator for a first pass at about 15 to 20 mm Hg, 60 to 140° C., wipe speed of 300 to 350 rpm and a feed flow rate of about 25 to 45 pounds per hours. The semi-pure product is then passed a second time through the wiping film evaporator at about 0.001 to 0.003 mm Hg, 220 to 250° C., wipe speed of 300 to 350 rpm and a feed flow rate of about 25 to 45 pounds/hour. The internal condenser temperature is maintained at 35 to 70° C. and the fatty acid distillate is collected at this step.

The third embodiment of this invention is called the pressure reactor, vacuum sparge strip process and is conducted initially as in the previous embodiment, in that, the vegetable oil is added to acetic acid, forming the organic layer and the aqueous layer.

The reactor is sealed and the contents heated to 85 to 120° C. with agitation. The oxidant is formed by the metered addition of the hydrogen peroxide to the reaction mixture that contains the acetic acid. At room temperature, the reaction between these components is very slow or non-existent, however, with agitation and heating, they react to form the oxidant. The pressure in the vessel at this point is on the order of 0 to 25 psig.

After all of the hydrogen peroxide has been added, the reaction mixture is heated to 125 to 135° C. and controlled at that temperature with cooling, if necessary. The oxidant is split in proportionately between the aqueous and organic phases, with the higher concentration found in the aqueous phase during the reaction.

After about 2 hours, at a temperature of about 125 to 135° C. and pressure of about 15 to 35 psig, the reaction is cooled to 50 to 90° C. with minimal agitation in order to avoid the formation of an emulsion. The phases separate and the aqueous phase is diverted to a holding tank for peroxygen content analysis. This stream is then transferred to the feed tank of the distillation column for the recovery of acetic acid. The organic phase is then transferred to the vacuum strip vessel for purification or it is stripped in the reactor.

The first step in the purification is to strip off the bulk of the acetic acid, aqueous phase and low boilers at 90 to 150° C. and 5 to 60 mm Hg. At this vacuum level, coolant is required on the condenser and receiver in order to capture the distillates and ease the load on the vacuum pump that should be equipped with a low temperature trap. The condensate is collected and transferred to the fractional distillation column feed tank for acetic acid recovery.

This leaves the product polyol with trace amounts of acetic acid, water, high boilers and some small amount of fatty acids to be removed. The vacuum level is raised to 2 to 15 mm Hg, while maintaining a small nitrogen sparge and heating the batch to about 220 to 250° C. The fatty acid distills off beginning at about 175 to 250° C. After the acid number of 1.0 mg KOH/g or less is achieved, the product is cooled to 50 to 70° C., an antioxidant is added and the product is filtered via a 100 to 250 micron filter media before transferring to storage.

It should be noted that these reactions and procedures need to be carried out in a glass lined reactor, or a metal alloy reactor that is not reactive with the hydrogen peroxide or acetic acid of the invention, such as 316 L stainless steel. If a 304 or 316 L stainless steel reactor is used, it must be passivated before use.

Passivation consists of cleaning the stainless steel with distilled water and following with a distilled water detergent solution at 49 to 52° C. A 5% w/w solution of sodium hydroxide/water at room temperature is then added and the surface pickled for one hour. Then nitric acid is added (30 to 35 weight % aqueous) to the reactor and the reactor is aged for about 2 hours at room temperature with agitation. Then it is washed with distilled water, and then a solution of 5% hydrogen peroxide is added to the reactor and it is checked for degradation. If no degradation is observed, the hydrogen peroxide is removed and the reactor is ready for use. If the reactor is used for some other type of reaction, the passivation procedure has to be re-done.

The hydroxylated vegetable oils of this invention are useful in the manufacture of a variety of polyurethane products. In particular, it has been found that the pure hydroxy functional vegetable oils according to the invention having an acid number of 2.0 or less, preferably 1.0 mg KOH/g or less, and most preferably 0.5 mg KOH/g or less, essentially zero peroxygens, 0.1% w/w or less water, 0.1% w/w or less organic acid used to prepare the hydroxy functional vegetable oil, low odor, and a color of 0.5 or less are very well suited for preparing a polyurethane article, especially cured polyurethane articles. For example, they are useful in the preparation of a variety of reactive, curable polyurethane systems, such as reaction injection molding, and castable elastomers, slab stock processes, extrusion processes, spray applied insulation processes. Such products can be for example, foams that are rigid, flexible, or semi-rigid. They can be high density and low density foams. Such foams, for example are useable for construction, such as insulation, and for the formation of articles, and for ornamental purposes, carpet backing, bun stock, slab stock, molded articles, spray applied insulation, and pour-in-place applications.

In the examples, 35% hydrogen peroxide was used as the source of peroxide, so a very large excess of water is present. An excess of peroxide is used in order to convert all of the alkenes to epoxides.

EXAMPLES

Example 1

Into a 500 ml glass flask, there was added 20 gms (19.52 mmoles) of solvent-free crude soybean oil. To the soybean oil at room temperature was added 40 ml of glacial acetic acid and 10.71 ml of 35% hydrogen peroxide, for a ratio of peroxide to glacial acetic acid of 5:1.

This mixture was heated to reflux for about 1 hour, at which time the reaction mixture was clear. The reaction mixture was cooled down enough to handle the materials and the materials were placed in a glass reparatory funnel and the bottom layer, (mostly acetic acid) was removed. The top layer was washed with saturated sodium bisulfite, sodium bicarbonate (saturated solution) followed by saturated sodium chloride solution. The material was then transferred to an Erlenmeyer flask and dried over magnesium sulfate and then stripped of any solvent and volatiles by using a rotary evaporator.

An FTIR analysis showed a large OH stretch at approximately 3300 $cm^{-1}$ and a reduction in $sp^2$ CH stretch at approximately 3050 $cm^{-1}$ indicating that the unsaturation in the molecule had been converted to hydroxyl (Table III).

For purposes of this invention, the functionality of the molecules was calculated in the following manner. There are approximately six double bond sites on a triglyceride derived from, for example, soybean oil. Due to steric hindrance, only four-point-six (4.6) of these can be accessed using the invention herein. The calculation of functionality is thus derived as follows:

$$\frac{(IV\ No._s - IV\ No._f)}{IV\ No._s} \times 4.6\ \text{(available alkene sites = Functionality)}$$

wherein:

IV No.=Iodine Number=No. Alkene per mole (cg $I_2$/g sample)

IV $No._s$=Starting material (RBD) soy oil) Iodine Number cg $I_2$/g sample)

IV $No._f$=Finished material Iodine Number 4.6=Number of accessible Alkenes on the Triglyceride

TABLE I

| Acid No. (mg KOH) | Functionality | OH No. (mg KOH) | Color |
| --- | --- | --- | --- |
| 0.9489 | 1.99 | 117.296 | 1.2601 |

TABLE II

| Acid No. (mg KOH) | Functionality | OH No. (mg KOH) | Color |
| --- | --- | --- | --- |
| 0.4782 | 3.00 | 168.5733 | $6.6 \times 10^{-2}$ |

TABLE III

| Acid No. (mg KOH) | Functionality | OH No. (mg KOH) | Color |
| --- | --- | --- | --- |
| 0.9156 | 4.27 | 184.9066 | 0.808651 |

Example 2

A second run was made as in the first example, except there was used 4 equivalents of peroxide. There was used 20 gms of crude soybean oil, 40 ml of glacial acetic acid, 6.7 ml of peroxide and the reaction was run at reflux for 1 hour. The FTIR analysis showed the formation of hydroxy compound, with a lesser reduction of $sp^2$ CH stretch at 3050 $cm^{-1}$ than showed in Example 1.

Example 3

A third run was made as in the first example, except there was used 3 equivalents of peroxide. There was used 20 gms of crude soybean oil 40 ml of glacial acetic, and 5.0 ml of peroxide. The reaction was run for 1 hour at reflux. The FTIR results were the same as Example 2,

Example 4

Four runs were made using (A) 2 equivalents, (B) 1 equivalent, (C) zero equivalent, and (D) 17 equivalents of peroxide. (A) consisted of 20 gms of crude soybean oil, 40 ml of glacial acetic acid, 3.3 ml of peroxide; (B) consisted of 20 gms of crude soybean oil, 40 ml of glacial acetic acid, 1.7 ml of peroxide; (C) consisted of 20 gms of crude soybean oil, 40 ml of glacial acetic acid, zero ml of peroxide, and 10 ml of water, and (D) consisted of 20 gms of crude soybean oil, 40 ml of glacial acetic acid, and 11.7 ml of peroxide. All were heated at reflux for 1 hour.

Example 5

Another run was carried out in which two formulations were prepared. (A) consisted of 1 equivalent of peroxide (18.06 mmole), 0.25 equivalents of crude soybean oil, 36 ml of glacial acetic acid, and (B) consisted of 10 equivalents of peroxide, 0.25 equivalents of crude soybean oil, 36 ml of glacial acetic acid. After heating for 1 hour at reflux the material cleared. The analytical results showed that there was complete clarity of sample B with no apparent $sp^2$ CH stretch at 3005 $cm^{-1}$ for the unsaturated group. FTIR showed that when 1 equivalent of peroxide was used, the majority of the product was unsaturated with only a small amount of hydroxylated compound.

Example 6

Another run was carried out in which a combination of two acids was used. To a 1 liter round-bottomed glass flask was added 100 gms of crude soybean oil, 17 ml of Glacial acetic acid and 35% hydrogen peroxide. To this mixture was added 11.1 ml of formic acid (a 1:1 ratio with the acetic acid). This mixture was allowed to heat at a low temperature (50° C.). The reaction mixture exothermed over the next 186 min to about 105° C. The reaction was then maintained at 105° C. and allowed to stir for an additional 3 hours. After the reaction was complete, as was evidenced by the disappearance of the color of the reaction mixture, the acid was removed along with water to yield a quantitative conversion of alkene to epoxide, to hydroxy ester as shown by FTIR.

Example 7

This example illustrates one embodiment of the invention.

Using a 15 gallon 316 L stainless steel reactor that has been passivated, the reactor was purged with nitrogen. The agitator was started and the reactor was vented through the reflux condenser. A small amount of chilled water was introduced to the reflux condenser and a low volume nitrogen sweep was provided to the reactor.

The reactor was charged with 16 pounds of distilled water followed by 29 pounds of 99% w/w glacial acetic acid and 57 pounds of raw soybean oil. With turbulent agitation, the materials were allowed to mix for 10 minutes.

To a day tank sized to hold sufficient 70% w/w of hydrogen peroxide for a single batch, there was charged 8 pounds of the oxidant. From the day tank, 8 pounds of hydrogen peroxide was metered to the reactor over 30 minutes, while maintaining turbulent agitation. The reactor was fitted with a reflux condenser and coolant was flowing through the condenser and available if needed for the reactor jacket. No reaction or exotherm was observed at this time.

At the finish of the addition of the oxidant, the reaction was heated to 85 to 90° C. At this temperature, there is sufficient heat to overcome the reaction activation energy of the reactants. Once the reaction was initiated, there was an exotherm which raised the reaction mixture to its boiling point of approximately 110° C. Boiling was vigorous initially but tapered off within the first 30 to 45 minutes. Then, external heating was required to maintain a vigorous reflux at about 110° C. and drive the reaction to completion. At the start of the reaction, the mass was yellow orange in appearance. It gradually faded to a beige colored, free flowing liquid as the reaction ended three hours later.

The reaction mixture was cooled to 70 to 80° C. and allowed to phase separate. The upper organic layer contained polyol/acetic acid and the lower aqueous phase contained water/acetic acid/polyol and some peroxygen. The organic layer was beige in color, had the appearance of an emulsion and was viscous at room temperature but very fluid at 70 to 80° C. The aqueous layer however, was virtually colorless, transparent and non-viscous. The interface between the two phases was distinct and without a rag edge.

After standing for about 45 minutes, the phases were separated and the aqueous layer was transferred to a holding tank and sampled for analysis. Approximately 80 to 85% of this stream was recycled to the next batch of reactants. There were three components of interest from the analysis, namely, water, acetic acid and peroxygen. This information was used to adjust the charge of these three components to the next batch reaction. The remaining 15 to 20% of this stream was transferred to a fractional distillation column feed tank for acetic acid recovery.

The organic layer containing the polyol was then transferred to a wiping film evaporator feed tank where it was pre-heated to 60° C. The polyol was then treated in the following manner. It was subjected to a flash evaporator (degasser) and two wiping film evaporators oriented in series with the polyol from the first unit feeding the second wiping film evaporator.

Before feeding to the first wiping film evaporator, the organic phase of the reaction was fed to a flash evaporator to remove the bulk of the acetic acid and aqueous phase. A vacuum of about 14 mm Hg and a temperature of about 115° C. was used. The polyol rich stream leaving the flash evaporator was diverted to the first wiping film evaporator and the acetic acid/aqueous phase distillate was moved to a fractional distillation column feed tank.

The feed for the first wiping film evaporator having a heated surface area of approximately 2.35 ft² was preheated with agitation. This unit was then evacuated using 14 mm Hg; the wall temperature raised to 115° C. and the wiper speed adjusted to 320 rpm. Feed was then introduced to the unit at a rate of 31.3 pounds/hour. The product and distillate streams were diverted to clean empty containers until steady state was achieved. Once the process reached equilibrium, the product was diverted to the feed tank for the second wiping film evaporator and the condensate was diverted to a fractional distillation column feed tank for the recovery of the acetic acid.

The material leaving the first wiping film evaporator had an acid number of about 4 mg KOH/g, no peroxygens, less than 0.1% w/w water and less than 0.1% w/w acetic acid. This stream was the one fed to the second wiping film evaporator.

The second wiping film evaporator was preheated to 60° C. with agitation. The unit was then evacuated (0.001 mm Hg), the wall temperature was raised to 240° C. and the wiper speed adjusted to 320 rpm. The feed was then introduced to the unit at a rate of 25.35 pounds per hour.

The product and distillate streams were diverted to clean empty containers until steady state was achieved. Once the process reaches equilibrium the product was collected in the product holding tank. The condensate was transferred to the fatty acid holding tank.

The product had an acid number of less than 1, there were no peroxygens, less than 0.1% w/w water and less than 0.1% w/w acetic acid.

Example 8

Handling of the discharge streams from example 7

There were four discharge streams of interest, namely, the aqueous phase from the reaction, the distillate from the degasser, the distillate from the first pass on the wiping film evaporator, the distillate from the second wiping film evaporator.

The aqueous phase isolated from the reaction contained recoverable quantities of acetic acid, water, hydrogen peroxide, polyol and peroxygen. After separation, the stream was analyzed for the components set forth above. The results were used to adjust the charge of pure hydrogen peroxide, acetic acid, and water to the next reaction. Approximately 80 to 85% w/w of the stream was recycled to the next batch. The remainder, about 15 to 20% w/w was quenched with sodium metabisulphite and transferred to the fractional distillation column for recovery of acetic acid.

The distillate recovered from the wiping film evaporators was transferred to the fractional distillation column for purification. The still was gradually heated to 116° C. At about 80° C. overhead temperature, a water rich stream started to azeotrope from the vessel. This stream had an aromatic odor indicating the presence of low boiling light ends. This was continued until the still temperature reached 117.9° C. and the overhead temperature reached 103.5° C. When the still temperature reached 120° C. and the overhead temperature settled at 117° C., acetic acid rich stream was transferred to the recovered acetic acid holding tank. The purity of this material was about 97.4 and the standard recovery was 92.28%.

The waste stream from this process was the bottoms from the fractional distillation column which consists primarily of water, light ends and discolored bottoms of the reaction.

Example 9

A 60 gallon 316 L stainless steel reactor was passivated prior to being used in this process. A nitrogen purge was provided to the reactor. The agitator was started and the reactor was vented through the reflux condenser. Coolant was applied to the reflux condenser and a nitrogen sweep on the reactor was begun.

To the reactor was charged 192 pounds of raw RBD (refined, bleached deodorized) soybean oil followed by 102 pounds of 99% w/w glacial acetic acid and 41 pounds of distilled water. With turbulent agitation the reactants were allowed to mix for 15 minutes. The reactor was sealed and heated to 110° C. with agitation that created a pressure of about 20 to 25 psig.

To a day tank sized to hold sufficient oxidant for a single batch was charged 41 pounds of 70% w/w hydrogen peroxide.

Forty one pounds of 70% hydrogen peroxide was metered from the day tank to the reactor over 120 minutes at a rate of 0.34 pounds/minute. The reactor pressure ranged between about 30 to 35 psig. Coolant was applied to the reactor jacket as needed to control the batch temperature at 110° C.±2° C. during the hydrogen peroxide addition.

After the hydrogen peroxide is charged, the reaction mixture was heated to 130° C. and aged for forty five minutes. At this temperature, the reaction was mildly exothermic and the reactor pressure ranged between 40 and 45 psig. Coolant was applied to the reactor jacket as needed to control the batch temperature to about 130° C.±2° C.

The reaction mass at the start was viscous with a yellow to orange appearance. It then turned to an orange-red appearance early in the reaction, gradually fading to a beige colored, free flowing liquid at the end of the reaction.

Approximately one hour after the hydrogen peroxide addition, the batch is sampled and analyzed, using HPLC, for completion of the reaction. The reactor is then cooled to 40° C. with minimal agitation to avoid formation of an emulsion.

After the mixture phase separates, the upper organic layer contains polyol/acetic acid and the lower aqueous phase contains water/acetic acid/polyol/fatty acid and peroxygen. The organic layer has the appearance of an emulsion and is viscous at 40° C. but very fluid at 70 to 80° C. The aqueous layer is virtually colorless, transparent and non-viscous. The interface is distinct and with a rag edge.

After approximately 120 minutes, the phases are separated and the aqueous layer is transferred to a holding tank and sampled for analysis. There are two options for handling the aqueous phase. There are three components of interest, namely, water, acetic acid and peroxygen. This information is used to adjust the charge of these three components to the next batch if the stream is being recycled. The remaining 15 to 20% of this stream is transferred to the fractional distillation column feed tank for acetic acid recovery.

The organic layer containing the polyol is transferred to the vacuum strip vessel for purification. The polyol is charged to a strip vessel and the unit was filled to about 85 to 90% w/w of its capacity. The vessel was equipped with a condenser and distillate receiver and coolant was applied to the condenser. Approximately 60 mm Hg vacuum was applied to the vessel via the condenser. The vessel was heated to 140° C. and held at that temperature until flow of distillate ceased.

A nitrogen spare of 32 standard cubic foot/hour per 100 pounds of product was applied to the strip vessel while maintaining good agitation. The batch was heated to 230° C. and at about 170° C. a white vapor was observed leaving the surface of the liquid. This material was fatty acid. A sample was taken for fatty acid analysis every hour after the batch temperature reached 200° C. When the acid number fell below 0.5 mg KOH/g, the purification step was terminated.

The pure product has an acid number of less than 0.5 mg KOH/g, it contained no peroxygen, had less than 0.1% w/w water and less than 0.1% w/w acetic acid.

There are three discharge steams of interest from this process, namely, the aqueous phase from the reaction, the distillate from the first distillation and the distillate from the second distillation step. The aqueous layer from the reaction and the distillate from the first distillation step were recycled. The distillate collected from the first distillation step was recovered by fractional distillation purification. This process is essentially the same as in example 8.

Example 10

Odor Testing

This example was carried out to test the odor of the polyols produced by the process as set forth in Example 1. Tested were polyols of 2.0, 3.0, and 4.0 functionality. Polyol A is a nominal 2.0 functional, secondary hydroxyl containing soybean oil-based polyol. The product has excellent visual clarity. Polyol B is a nominal 3.0 functional, secondary hydroxyl containing soybean oil-based polyol. This product is visually clear in appearance. Polyol C is a nominal 4.0 functional, secondary hydroxyl containing soybean oil-based polyol. This product is visually clear.

The above-mentioned polyols were compared against the following polyols. Arcol® LG-168, a petroleum-based polyether triol made by the addition of propylene oxide to a glycerin-based initiator compound. The material is available from Bayer Material Science Corporation and has typical properties of 1000 molecular weight, water white color, visual clarity, characteristic polyether polyol odor, terminal secondary hydroxyls and a hydroxyl number in the range of 158 to 178 mg KOH/g. Soyol® R3-170E, is a soybean oil-based product designed for use in a wide range of polyurethane applications. The material is available from the Urethane Soy Systems Company. Reported properties are: a functionality of 3, a hydroxyl number in the range of 160 to 180 mg KOH/g, an acid number in the range of 0.5 to 2.5 mg KOH/g and a 25° C. viscosity in the range of 1000'0 mPa·s. The product is yellow in color, opaque to visible light and reveals an odor suggestive of crude soybean oil. SoyOyl® P38N is a soybean oil-based product for semi-flexible and rigid foam applications from the Urethane Soy Systems Company. Typical reported properties include a functionality of 3, a hydroxyl number of 275 mg KOH/g and 25° C. viscosity of 2700 mPa·s. The product contains significant levels of added glycerin and sucrose. The product is amber in color, lacks visual clarity and reveals an odor suggestive of crude soybean oil.

SoyOyl® P38N is a soybean oil-based product for flexible urethane applications offered by Urethane Soy Systems Company. Typical properties include a functionality of 2, a hydroxyl number of 53 mg KOH/g and 25° C. viscosity of 2800 mPa·s. The product is amber in color, visually clear and reveals a strong odor suggestive of raw soybean oil.

The protocol for testing of inherent odor of a polyol was based on a combination of the SAE J1351 and General Motors GME 60276 odor testing procedures. The experimental conditions from the SAE procedure and the grading scale from the GME procedure were used. The test involved providing 10 grams of each candidate polyol each weighed into a separate new, cleaned and dried 1-quart metal can. The lids were placed in position, but not firmly sealed and the cans were placed in a 65° C. air-circulating oven for one hour. One empty can was included as a control.

Upon removal from the oven, each can was evaluated for odor by a panel of 3 trained and experienced people. To allow for more discrimination between samples the normal 1 to 5 rating scale of the SAE J1351 test was replaced by the following GME-based test ratings scale.

| Odor Perception | Score |
|---|---|
| Odorless | 10 |
| Just Noticeable | 9 |
| Noticeable | 8 |
| Slight | 7 |
| Tolerable | 6 |
| Borderline Tolerable | 5 |
| Objectionable | 4 |
| Annoying | 3 |
| Very Annoying | 2 |
| Intolerable | 1 |

The results:

| Sample | Panelist Number | Sample Rating | Average Rating |
|---|---|---|---|
| Empty Can | 1 | 10 | 10 |
| | 2 | 10 | |
| | 3 | 10 | |
| Arcol LG-168 | 1 | 8 | 8 |
| | 2 | 8 | |
| | 3 | 7 | |
| Polyol A | 1 | 7 | 7 |
| | 2 | 7 | |
| | 3 | 7 | |
| Polyol B | 1 | 8 | 8 |
| | 2 | 7 | |
| | 3 | 8 | |
| Polyol C | 1 | 7 | 7 |
| | 2 | 8 | |
| | 3 | 7 | |
| Soyol R3-170-E | 1 | 5 | 6 |
| | 2 | 6 | |
| | 3 | 7 | |
| SoyOyl GC5N | 1 | 7 | 6 |
| | 2 | 6 | |
| | 3 | 6 | |
| SoyOyl 1P38N | 1 | 3 | 4 |
| | 2 | 3 | |
| | 3 | 6 | |

The data in the above table just above shows that the liquid polyol samples of this invention had a slight odor or better on the GME rating scale. Two of the samples, the petroleum-based polyol Arcol LG-168 and the inventive soy Polyol B received a rating of 8 indicating that the panel was able to notice an odor but had no further comment about that. The inventive soy polyols Polyol A and C received the next highest rating of 7 indicating that an odor was noticeable but was not objectionable to any of the panelists.

Example 11

Freeze/Thaw Stability

The protocol for testing the freeze/thaw stability of a polyol begins by placing 80 grams of a neat polyol into a 120 milliliter wide-mouth, clear, glass jar. The lid is securely tightened and the glass jar is placed in a 0° C. freezer for 4 hours. After the freezing period, the sample is removed from the freezer and allowed to warm up to ambient laboratory temperature (about 24° C.) overnight. The following morning, the sample is visually inspected to check for the presence of precipitated particles, suspended particles, floating particles or a visible haze of any kind. The % T notation refers to the percent transmission of visible light through the sample. The process is then repeated for 5 separate freeze thaw cycles. The results of the freeze/thaw stability testing are presented in the following table.

TABLE

Freeze/Thaw Stability Testing Results

| Sample | Initial Appearance | 1 | 2 | 3 | 4 | 5 |
|---|---|---|---|---|---|---|
| Arcol LG-168 | Water White | No Change | ✓ | ✓ | ✓ | ✓ |
| | Visually Clear (100% T) | No Change | ✓ | ✓ | ✓ | ✓ |
| | No visible Solids | No Change | ✓ | ✓ | ✓ | ✓ |
| Polyol from Example 1 | Light Amber Color | No Change | ✓ | ✓ | ✓ | ✓ |
| | Visually Clear (100% T) | No Change | ✓ | ✓ | ✓ | ✓ |
| | No visible Solids | No Change | ✓ | ✓ | ✓ | ✓ |
| Polyol from Example 2 | Light Amber Color | No Change | ✓ | ✓ | ✓ | ✓ |
| | Visually Clear (100% T) | No Change | ✓ | ✓ | ✓ | ✓ |
| | No visible Solids | No Change | ✓ | ✓ | ✓ | ✓ |
| Polyol from Example 3 | Light Amber Color | No Change | ✓ | ✓ | ✓ | ✓ |
| | Visually Clear (100% T) | No Change | ✓ | ✓ | ✓ | ✓ |
| | No visible Solids | No Change | ✓ | ✓ | ✓ | ✓ |
| Soyol R3-170-E | Yellow Color | No Change | ✓ | ✓ | ✓ | ✓ |
| | Opaque (0% T) | No Further Degradation | | | ✓ | ✓ |
| | Visible Suspended Solids | No Further Degradation | | | ✓ | ✓ |
| SoyOyl GC5N | Amber Color | No Change | ✓ | ✓ | ✓ | ✓ |
| | Opaque (0% T) | No Further Degradation | | | ✓ | ✓ |
| | Visible Suspended Solids | No Further Degradation | | | ✓ | ✓ |
| SoyOyl P38N | Amber Color | No Change | ✓ | ✓ | ✓ | ✓ |
| | Visually Clear (100% T) | 98% T | 96% T | 95% T | 92% T | 90% T |
| | No Visible Solids | Just Visible | Just Visible | Easily Visible | Easily Visible | Prominent |

The Arcol LG-168 sample in the above table illustrates how a traditional petroleum-based polyol can be run through several freeze/thaw cycles without any obvious change in the product appearance. The next three samples demonstrate that three of the inventive polyols go through multiple freeze/thaw cycles without damage to the polyol quality. The next following two samples are prior art soy-based polyols that in their original form are opaque to visible light and already full of suspended solids. Subjecting these two products to a number of freeze/thaw cycles gave no evidence of further degradation.

The SoyOyl P38N is a prior art polyol that begins with characteristics of visual clarity and no evidence of visible solids. With each successive freeze/thaw cycle, this material changes in visual clarity due to the formation of an increasing concentration of visible particles.

While the invention will be described with respect to various embodiments thereof, it will be understood by those skilled in the art that various changes in detail may be made therein without departing from the spirit, scope, and teaching of the invention. Accordingly, the invention herein disclosed is to be limited only as specified in the claims.

In the drawings and specification, there have been disclosed typical embodiments of the invention and, although specific terms have been employed, they have been used in a generic and descriptive sense only and not for purposes of limitation, the scope of the invention being set forth in the following claims.

What is claimed is:

1. A process of preparing a hydroxy functional soybean oil, the process comprising:
   (A) providing a reactor;
   (B) adding a raw soybean oil and an organic acid having 1 to 3 carbon atoms to the reactor to form an organic phase and an aqueous phase;
   (C) heating the organic phase and the aqueous phase to about 50 to 135° C. with agitation generating a hot mixture;
   (D) metering a 35 to 70% weight/weight of hydrogen peroxide/water to the hot mixture of (C) generating a reaction mixture;
   (E) heating the reaction mixture in a range of 50 to 135° C. for about 1 to 24 hours;
   (F) stripping off the bulk of the organic acid, water and other low boilers at or below 150° C. and at a negative pressure that does not exceed 60 mmHg until the reaction mixture tests for an acid number of about 4.0 mg KOH/g or less.

2. The process of claim 1, further comprising a nitrogen sparge during the stripping step (F).

3. The process of claim 1, further comprising forcing, under pressure, a material selected from the group consisting of (i) steam, and, (ii) a gas non-reactive with the soybean oil, up through the reaction mixture to remove high boiling impurities and organic acids during the stripping step (E).

4. A hydroxy functional soybean oil having an acid number of about 4 mg KOH/g or less, 0.1% w/w or less of water, and 0.1% w/w or less of organic acid used to prepare the hydroxy functional soybean oil.

5. A process of preparing a hydroxy functional soybean oil having an acid number of about 4 mg KOH/g or less, the process comprising contacting a raw soybean oil with hydrogen peroxide and an organic acid in the presence of water for a sufficient period of time, a sufficient temperature, and a sufficient pressure to form hydroxyl groups from unsaturated moieties in the raw soybean oil, and thereafter separating any volatiles from the hydroxy functional soybean oil by distillation, wherein the organic acid has from 1 to 3 carbon atoms.

6. The process of claim 5, wherein the raw soybean oil is contacted with a combination of the peroxide and organic acid essentially simultaneously.

7. The process of claim 5, wherein the raw soybean oil is contacted with the organic acid first, and then contacted with the peroxide.

8. The process of claim 5, wherein the raw soybean oil is contacted with the peroxide first and then is contacted with the organic acid.

9. The process of claim 5, wherein the time of reaction is from 1 to 24 hours.

10. The process of claim 5, wherein the temperature ranges from about 50° C. to about 135° C.

11. The process of claim 5, wherein the amount of organic acid that is used is less than about 2.0 mass units per mass unit of raw soybean oil.

12. The process of claim 5, wherein the organic acid that is used is a mixture of two organic acids.

13. The process of claim 5, wherein the amount of peroxide that is used ranges from about 0.1 to about 6.0 equivalents per mole of raw soybean oil.

14. The process of claim 5, wherein there is additionally present a solvent.

15. The process of claim 5, wherein the distillation is carried out at a distillation temperature at or below 150° C.

16. The process of claim 15, wherein there is a negative pressure applied during the distillation that does not exceed about 60 mmHg.

17. The process of claim 16, wherein the distillation temperature and negative pressure are continued until the hydroxy functional soybean oil tests for an acid number of about 4 mg KOH/g or less.

18. The process of claim 5, wherein the distillation is a wiped film evaporation, short path distillation, packed column stripping, or a combination of thereof.

* * * * *